United States Patent
Um et al.

(10) Patent No.: US 8,924,774 B2
(45) Date of Patent: Dec. 30, 2014

(54) SEMICONDUCTOR MEMORY DEVICE AND METHOD FOR OPERATING THE SAME

(71) Applicant: SK Hynix Inc., Gyeonggi-do (KR)

(72) Inventors: Gi-Pyo Um, Gyeonggi-do (KR); Sang-Sik Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 187 days.

(21) Appl. No.: 13/719,757

(22) Filed: Dec. 19, 2012

(65) Prior Publication Data

US 2013/0166949 A1    Jun. 27, 2013

(30) Foreign Application Priority Data

Dec. 21, 2011    (KR) .................. 10-2011-0139641

(51) Int. Cl.
*G06F 11/00* (2006.01)
*G06F 11/07* (2006.01)

(52) U.S. Cl.
CPC .......... *G06F 11/0793* (2013.01); *G06F 11/073* (2013.01)
USPC ........................................ 714/6.1; 714/6.11

(58) Field of Classification Search
CPC ....................................... G06F 11/07
USPC ................... 714/6.1, 6.11, 6.12, 6.13, 6.2
See application file for complete search history.

(56) References Cited

U.S. PATENT DOCUMENTS

| 7,681,094 B2 * | 3/2010 | Guterman et al. ............ 714/718 |
| 8,356,231 B2 * | 1/2013 | Cornwell et al. ............. 714/764 |
| 2010/0070801 A1 * | 3/2010 | Cornwell et al. ................ 714/6 |
| 2012/0144272 A1 * | 6/2012 | Franceschini et al. ........ 714/773 |
| 2013/0173846 A1 * | 7/2013 | Lassa et al. .................. 711/103 |

FOREIGN PATENT DOCUMENTS

KR    1020080036332    4/2008

* cited by examiner

*Primary Examiner* — Dieu-Minh Le
(74) *Attorney, Agent, or Firm* — IP & T Group LLP

(57) ABSTRACT

A semiconductor memory device includes, a memory cell array configured to include a plurality of memory cells each having a plurality of logic pages, an error detector configured to detect a recovery target data among the data stored in the memory cell array, and output a logic page information of the recovery target data, a data recoverer configured to recover the recovery target data by using adjustment of a read reference voltage in response to the logic page information of the recovery target data, and a page buffer configured to read the recovery target data output from the memory cell array and write a recovered data output from the data recoverer in the memory cell array.

12 Claims, 4 Drawing Sheets

SEMICONDUCTOR MEMORY DEVICE AND METHOD FOR OPERATING THE SAME

CROSS-REFERENCE TO RELATED APPLICATIONS

The present application claims priority of Korean Patent Application No. 10-2011-0139641 filed on Dec. 21, 2011, which is incorporated herein by reference in its entirety.

BACKGROUND

1. Field

Exemplary embodiments of the present invention relate to a semiconductor designing technology, and more particularly, to a semiconductor memory device and a method for operating the same.

2. Description of the Related Art

Generally, semiconductor memory devices are divided into volatile memory devices, such as Dynamic Random Access Memory (DRAM) and Static Random Access Memory (SRAM), and non-volatile memory devices, such as Programmable Read Only Memory (PROM), Erasable PROM (EPROM), Electrically EPROM (EEPROM), and flash memory device. What distinguishes a non-volatile memory device from a volatile memory device is whether or not the data stored in a memory cell is retained after a certain time.

In other words, whereas the volatile memory device does not retain the data stored in its memory cells after the certain time, the non-volatile memory device retains the data stored in its memory cells after the certain time. Therefore, the volatile memory device necessarily performs an additional operation such as a refresh operation to retain the data, whereas the non-volatile memory device does not perform the refresh operation. Since this feature of the non-volatile memory device is appropriate for low power consumption and high integration, the non-volatile memory device has been widely used as a storage medium for portable devices in recent years.

Among the non volatile memory devices, a flash memory device stores a data in a memory cell through a program operation and an erase operation. The program operation means an operation for accumulating electrons in a floating gate of a transistor that constitutes a memory cell, and the erase operation means an operation for discharging the electrons that are accumulated in the floating gate of the transistor into a substrate. The flash memory device accumulates or discharges electrons in or out of the floating gate through the program operation or the erase operation, and each memory cell gets a cell distribution corresponding to a data of '0' or '1'.

As described above, one memory cell stores a data of '0' or '1'. In other words, one memory cell stores a one-bit data, and such memory cell is referred to as a single-level cell. Recently, a method of storing a data of more than one bit in one memory cell has been developed, and this kind of a memory cell is referred to as a multi-level cell. The single-level cell needs one read reference voltage to decide whether the data stored in the memory cell is '0' or '1'. On the other hand, the multi-level cell, for example, a two-level cell needs at least three read reference voltages to decide whether the data stored in the memory cell is '00', '01', '10', or '11'.

FIG. 1 is a cell distribution diagram illustrating a program operation of a conventional flash memory device. Referring to FIG. 1, (A) shows a cell distribution during a lower-bit program operation. For example, a distribution 'E' is the distribution of the erased cells in which data '1' is stored, and a distribution 'PV1' is the distribution of the programmed cells in which data '0' is stored. Meanwhile, (B) shows a cell distribution during an upper-bit program operation. For example, a distribution 'E' is the distribution of the erased cells in which data '11' is stored; a distribution '01' is the distribution of the programmed cells in which data '01' is stored; a distribution 'PV2' is also the distribution of the programmed cells in which data '10' is stored; and a distribution 'PV 3' is also the distribution of the programmed cells in which data '00' is stored.

To be specific, two distributions are formed in a lower-bit page of the memory cell through the lower-bit program operation (A), and it takes one reference voltage VR to distinguish the two distributions from each other. Four distributions are formed in an upper-bit page of the memory cell through the upper-bit program operation (B), and it takes three reference voltages, which are first to third reference voltages VR1, VR2 and VR3 to distinguish the four distributions from each other.

Meanwhile, a flash memory device loses data for various reasons. Among the reasons is a case that there is an abnormality in power in the course of performing an upper-bit program operation after completing a lower-bit program operation and forming a normal cell distribution. When the abnormality in power occurs, not only a cell distribution that is supposed to be formed through the upper-bit program operation but also the cell distribution before the upper-bit program operation, which is the cell distribution that is normally formed through the lower-bit program operation, is lost. Therefore, the reliability of a flash memory device is declined due to such data loss.

SUMMARY

Exemplary embodiments of the present invention are directed to a flash memory device capable of recovering a data that is lost due to an abnormality in power supply.

In accordance with an embodiment of the present invention, a semiconductor memory device includes, a memory cell array configured to include a plurality of memory cells each having a plurality of logic pages, an error detector configured to detect a recovery target data among the data stored in the memory cell array, and output a logic page information of the recovery target data, a data recoverer configured to recover the recovery target data by using adjustment of a read reference voltage in response to the logic page information of the recovery target data, and a page buffer configured to read the recovery target data output from the memory cell array and write a recovered data output from the data recoverer in the memory cell array.

In accordance with another embodiment of the present invention, a method for operating a flash memory device includes, writing data in a memory cell array including a plurality of memory cells each having a plurality of logic pages, reading the data stored in the memory cell array based on a read reference voltage, detecting a recovery target data among the read data, checking a logic page of the recovery target data, adjusting the read reference voltage when the recovery target data is a lower-bit logic page data, and re-reading the recovery target data based on the adjusted read reference voltage.

The flash memory device in accordance with an embodiment of the present invention may detect a logic page of a recovery target data among the data stored in a memory cell array and recover a recovery target data based on the detected logic page.

DETAILED DESCRIPTION

Figure 1:
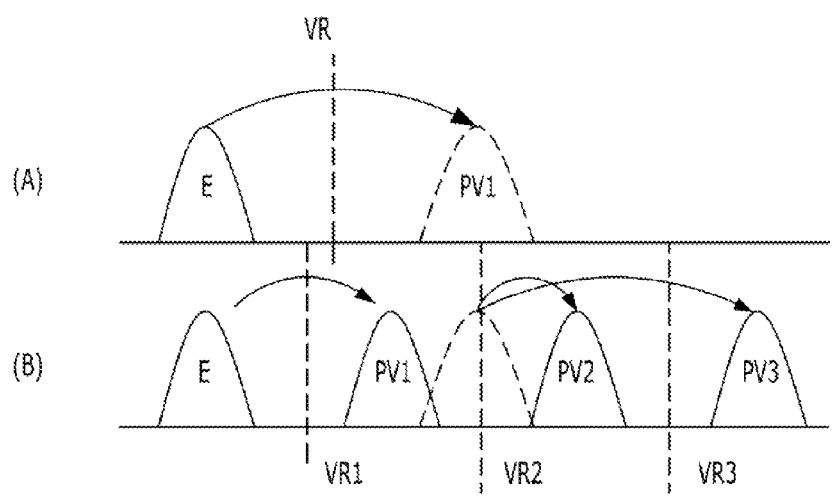
FIG. 1 is a cell distribution diagram illustrating a program operation of a conventional flash memory device.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
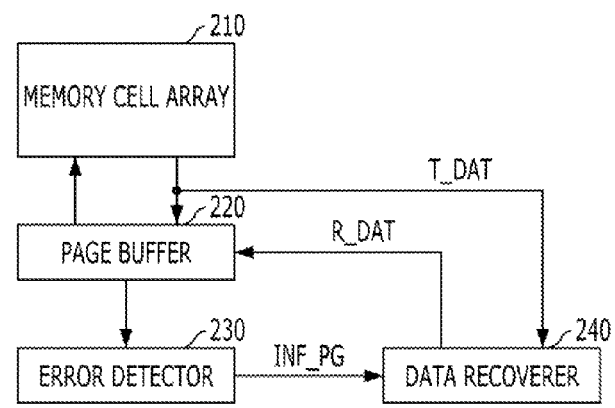
FIG. 2 is a block diagram illustrating a portion of a flash memory device in accordance with an embodiment of the present invention.

FIG. 2 is a block diagram illustrating a portion of a flash memory device in accordance with an embodiment of the present invention.

Referring to FIG. 2, the flash memory device includes a memory cell array 210, a page buffer 220, an error detector 230, and a data recoverer 240.

The memory cell array 210 includes a plurality of memory cells for storing data. Each memory cell has a plurality of logic pages Hereafter, it is assumed that each memory cell includes a lower-bit (e.g., LSB) page and an upper-bit (e.g., MSB) page. Information on the lower-bit page and the upper-bit page of each memory cell may be stored in a flag cell.

The page buffer 220 performs a read/write operation to the memory cell array 210. The page buffer 220 may receive a recovered data R_DATA from the data recoverer 240 and write the recovered data R_DATA in the memory cell array 210.

Meanwhile, the data stored in the memory cell array 210 are lost for various reasons. The flash memory device in accordance with the embodiment of the present invention may recover the lost data by using the error detector 230 and the data recoverer 240. Hereafter, the data that is lost and to be recovered is referred to as a recovery target data T_DATA.

The error detector 230 receives the data output from the page buffer 220 to detect the recovery target data T_DATA, and transfers logic page information INF_PG of the recovery target data T_DATA to the data recoverer 240. The logic page information INF_PG has information on whether the recovery target data T_DATA is stored in the lower-bit page or the upper-bit page of the memory cell. The error detector 230 may be formed of an error correction circuit (ECC).

The data recoverer 240 recovers the recovery target data T_DATA in response to the logic page information INF_PG. The recovered data R_DATA is input to the page buffer 220, and the page buffer 220 writes the recovered data R_DATA in the memory cell array 210. The recovered data R_DATA may be written in the memory cell where the recovered data R_DATA used to be written, or in another memory cell. If the recovered data R_DATA is written in another memory cell, an access operation may be performed through an address mapping between the existing memory cell and the new memory cell where the recovered data R_DATA is newly written.

Figure 3:
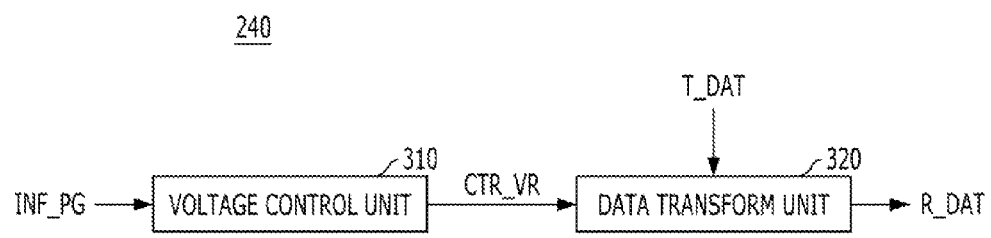
FIG. 3 is a detailed diagram illustrating a data recoverer shown in FIG. 2.

FIG. 3 is a detailed diagram illustrating the data recoverer 240 shown in FIG. 2.

Referring to FIG. 3, the data recoverer 240 includes a voltage control unit 310 and a data transform unit 320.

The voltage control unit 310 controls a read reference voltage in response to the logic page information INF_PG. The read reference voltage is used to decide the value of a data during a read operation. The voltage level of an adjusted read reference voltage CTR_VR that is adjusted based on the logic page information INF_PG is different from the voltage level of the read reference voltage. The voltage level of the adjusted read reference voltage CTR_VR may be higher than the voltage level of the reference voltage. The voltage control unit 310 may include a counter to control the level of the read reference voltage to output the adjusted read reference voltage CTR_VR.

The data transform unit 320 transforms the recovery target data T_DATA in response to the adjusted read reference voltage CTR_VR to output the recovered data R_DATA.

Figure 4:
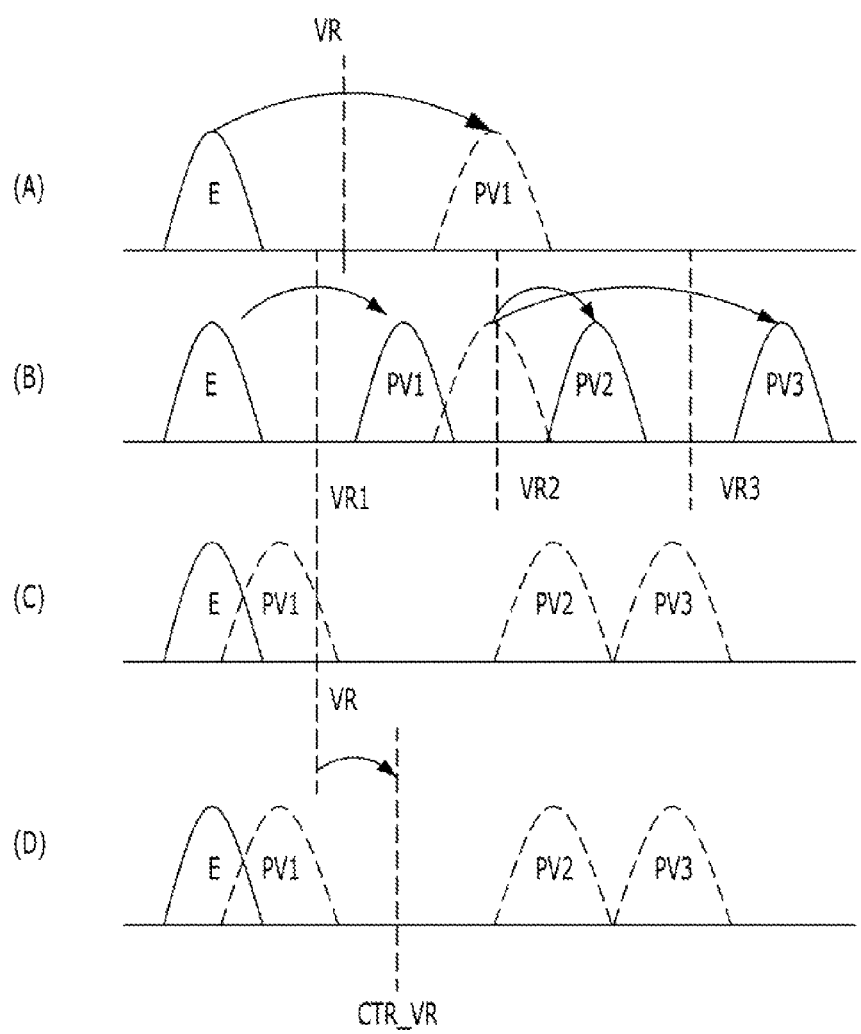
FIG. 4 is a cell distribution diagram illustrating an operation of a flash memory device in accordance with an embodiment of the present invention.

FIG. 4 is a cell distribution diagram illustrating an operation of a flash memory device in accordance with an embodiment of the present invention.

Referring to FIG. 4, (A) shows a cell distribution during a lower-bit (LSB) program operation. For example, a distribution 'E' is the distribution of erased cells in which data '1' is stored, and a distribution 'PV1' is the distribution of the programmed cells in which data '0' is stored. (B) shows a cell distribution during an upper-bit (MSB) program operation. For example, a distribution 'E' is the distribution of erased cells in which data '11' is stored; a distribution 'PV3' is the distribution of the programmed cells in which data '01' is stored data a distribution 'PV2' is also the distribution of the programmed cells in which data '10' is stored; and a distribution 'PV3' is also the distribution of the programmed cells in which data '00' is stored.

Meanwhile, a cell distribution of (C) may be formed when an abnormality in power occurs when the upper-bit program operation (B) is performed after the lower-bit program operation (A) is performed, and as a result, a normal cell distribution is formed. As illustrated in FIG. 4, the distribution 'PV1', the distribution 'PV2', and the distribution 'PV3' are positioned differently from the cell distributions of the upper-bit program operation (B). Under the circumstances, when the distribution 'PV1' is decided as a read reference voltage VR during a normal operation, an obscure data is output due to the obscure cell distribution 'PV1'. This means that the distribution 'PV1' of (C) has lost not only the data corresponding to the upper-bit but also the data corresponding to a lower-bit.

The flash memory device in accordance with the embodiment of the present invention increases the read reference voltage VR during a read operation and decides the distribution 'PV1' cell distribution to recover the lost lower-bit data in the above circumstances. In other words, the flash memory device controls the read reference voltage VR during a read operation as shown in (D) and decides the distribution 'PV1' based on the increased read reference voltage CTR_VR. The distribution (D) is decided based on the increased read reference voltage CTR_VR, and this signifies that the data corresponding to the lower-bit of the distribution 'PV1' may be recovered. In other words, the distribution 'A' may be formed again by programming the distribution 'PV1' of the distribution (D) based on the result of the distribution (D), and it may be possible to extract an exact data that corresponds to the lower-bit in the distribution (A). Subsequently, a program operation for the upper-bit, which is initially supposed to be stored, may be performed after the recovery is carried out by extracting the lower-bit.

Figure 5:
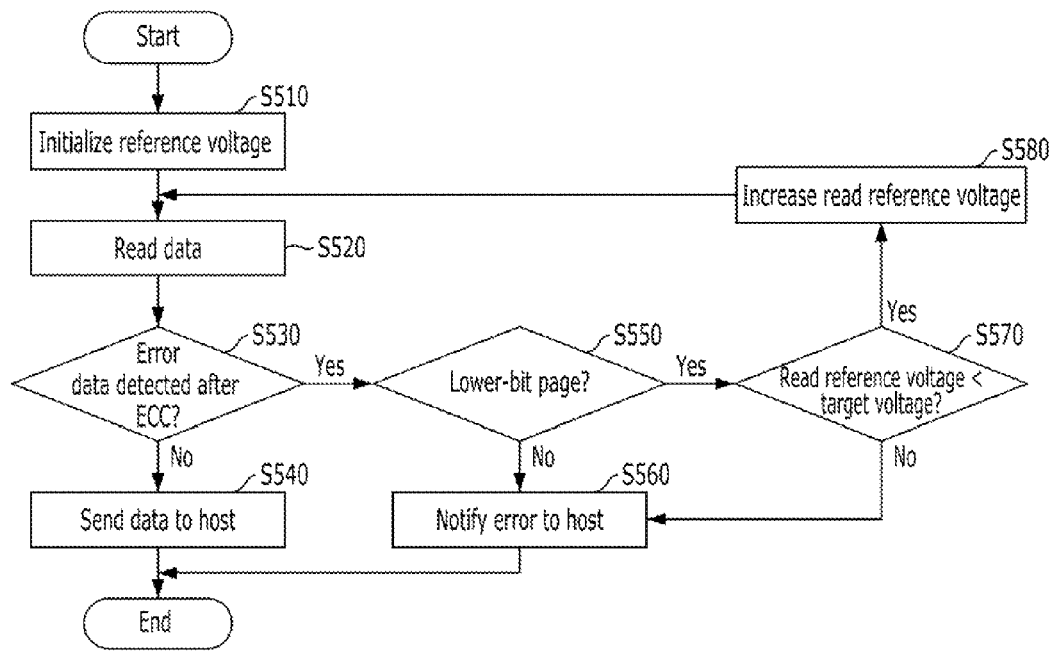
FIG. 5 is a flowchart illustrating an operation of a system including a flash memory device in accordance with another embodiment of the present invention.

FIG. 5 is a flowchart illustrating an operation of a system including a flash memory device in accordance with another embodiment of the present invention.

Referring to FIG. 5, the operation of the system includes: initializing a read reference voltage in step S510; reading a data in step S520; deciding whether there is a data error or not after performing an ECC operation in step S530; sending the data to a host in step S540; deciding whether the logic page is a lower-bit page in step S550; notify error to the host in step S560; checking whether the read reference voltage is lower than a target voltage in step S570; and increasing the read reference voltage in step S580. Hereafter, the operation in accordance with the embodiment of the present invention is described with reference to FIGS. 4 and 5. In FIG. 5, it is assumed that the system includes a flash memory device and a host, e.g., CPU. It is also assumed that a LSB program operation and a MSB program operation are already performed to a memory cell array.

First of all, when the host requests to perform a data read operation, the read reference voltage is initialized in the step S510. Subsequently, a data is read based on the reference voltage in the step S520, and then the read data is analyzed in an ECC in the step S530.

If it is determined in the step S530 that there is no data error ("No"), the flash memory device sends the read data to the host in the step S540. Otherwise, if it is determined in the step S530 that there is a data error ("Yes"), the flash memory device checks whether the data error is from a lower-bit page or not, in the step S550.

If it turns out in the step S550 that the logic page having the data error is not from the lower-bit page but the upper-bit page ("No"), the flash memory device notifies to the host that a data error occurred and the data cannot be recovered in step S560. Otherwise, if it turns out in the step S550 that the logic page having the data error is from the lower-bit page ("Yes"), the flash memory device checks whether the read reference voltage is lower than a given target voltage or not in step S570. Herein, the process of the step S570 defines the upper limit of the read reference voltage to prevent the process loop from running infinitely.

If it turns out that, in the step S570, the read reference voltage is equal to or higher than the target voltage ("No"), the flash memory device notifies to the host that the data may not be recovered anymore (S560). Otherwise, when it is determined in step S570 that the read reference voltage is lower than the given target voltage ("Yes"), the read reference voltage is increased in step S580. Subsequently, the data is read again based on the adjusted reference voltage (S520).

The erroneous data stored in the lower-bit page may be recovered with a data corresponding to the lower-bit page through the recovering process. The recovered data may be transferred to the host as illustrated in FIG. 5, and it may be also possible to store the recovered data in the memory cell as illustrated in FIG. 4. In other words, the recovered data may be used for various purposes.

After all, the flash memory device in accordance with the embodiment of the present invention may detect a data error occurred in the lower-bit page and perform a data recovery operation by using the adjustment of the read reference voltage. When a data error is detected in the upper-bit page, the flash memory device in accordance with the embodiment of the present invention does not perform an unnecessary data recovery operation and quickly searches for a solution by reporting the host of the data error.

As described above, the flash memory device in accordance with an embodiment of the present invention may recover a lost data to improve the reliability of the flash memory device.

While the present invention has been described with respect to the specific embodiments, it will be apparent to those skilled in the art that various changes and modifications may be made without departing from the spirit and scope of the invention as defined in the following claims.

What is claimed is:

1. A semiconductor memory device, comprising:
    a memory cell array configured to include a plurality of memory cells each having a plurality of logic pages;
    an error detector configured to detect a recovery target data among the data stored in the memory cell array, and output a logic page information of the recovery target data;
    a data recoverer configured to recover the recovery target data by using adjustment of a read reference voltage in response to the logic page information of the recovery target data; and
    a page buffer configured to read the recovery target data output from the memory cell array and write a recovered data output from the data recoverer in the memory cell array.

2. The semiconductor memory device of claim 1, wherein the data recoverer includes:
    a voltage control unit for increasing the read reference voltage for reading a lower-bit logic page when the recovery target data is a lower-bit logic page data; and
    a data transform unit for transforming the recovery target data by using the increased read reference voltage.

3. The semiconductor memory device of claim 2, wherein the voltage control unit includes a counter configured to control a level of the increased read reference voltage.

4. The semiconductor memory device of claim 1, wherein the error detector includes an Error Correction Circuit (ECC).

5. A method for operating a flash memory device, comprising:
    writing data in a memory cell array including a plurality of memory cells each having a plurality of logic pages;
    reading the data stored in the memory cell array based on a read reference voltage;
    detecting a recovery target data among the read data;
    checking a logic page of the recovery target data;
    adjusting the read reference voltage when the recovery target data is a lower-bit logic page data; and
    re-reading the recovery target data based on the adjusted read reference voltage.

6. The method of claim 5, further comprising:
    checking whether the read reference voltage is lower than a given upper limit voltage before adjusting of the read reference voltage.

7. The method of claim 5, wherein the writing of the data in the memory cell array includes:
    programming a first data in a lower-bit logic page of a memory cell; and
    programming a second data in a higher-bit logic page of the memory cell.

8. The method of claim 5, wherein the detecting of the recovery target data is performed in an Error Correction Circuit (ECC).

9. The method of claim 5, further comprising:
    initializing the read reference voltage before reading of the data.

10. The method of claim 5, further comprising:
sending the read data to a host when the recovery target data is not detected.

11. The method of claim 5, further comprising:
notifying an error to a host when the recovery target data is stored in upper-bit page.

12. The method of claim 6, further comprising:
notifying an error to a host when the read reference voltage is not lower than the given upper limit voltage.

* * * * *